3,793,306
PROCESS FOR REMOVAL OF CATALYST
RESIDUES
Ralph C. Farrar and Richard J. Sonnenfeld, Bartlesville, Okla., assignors to Phillips Petroleum Company, Bartlesville, Okla.
No Drawing. Filed Jan. 3, 1973, Ser. No. 320,715
Int. Cl. C08d 5/04
U.S. Cl. 260—85.1      10 Claims

ABSTRACT OF THE DISCLOSURE

The removal of hydrogenation catalyst residues from hydrogenated thermoplastic or elastomeric polymers in solution is readily achieved by treating the hydrogenated catalyst residue-containing polymer solution with an aqueous solution of a water-soluble phosphate salt in the presence of an oxidizing agent prior to separation.

---

This invention relates to polymerization processes. More particularly, the invention relates to the removal of catalyst residues from hydrogenated thermoplastic and elastomeric polymers in solution.

The catalytic hydrogenation of unsaturated polymers such as unsaturated rubbers is a widely used industrial process. Generally, the hydrogenation catalyst can be deactivated and removed from the hydrogenated polymer-containing reaction effluent by the addition of water followed by filtration. However, when the hydrogenation is carried out in the presence of a trihydrocarbyl aluminum-reduced organonickel compound as the catalyst, separation of the catalyst residues is made difficult by the formation of a gelatinous precipitate when water is added. With such catalysts, the problem of the gelatinous precipitate has been largely overcome by the addition of aqueous phosphate compositions prior to filtration. While effective in deactivating the catalyst and providing an essentially nongelatinous precipitate, the use of such aqueous phosphate compositions has not been entirely effective in causing essentially complete precipitation of the catalyst, with the result that sufficient zero-valent nickel passes through the filter in a finely divided, colloidal form, to contaminate the polymer product.

It is an object of the present invention to provide an improved process for the removal of hydrogenation catalyst residues from a hydrogenated polymer composition containing such residues. It is another object of the present invention to provide a process for the removal of hydrogenation catalyst from solutions of polymers in a manner which avoids the formation of colloidal-size precipitates. Other aspects, objects and advantages of this invention will be apparent from the disclosure and claims.

In accordance with the present invention, it has been discovered that treating a solution of a hydrogenated thermoplastic or elastomeric polymer containing trihydrocarbyl aluminum-reduced organonickel hydrogenation catalyst with an aqueous phosphate solution in the presence of an oxidizing agent results in a polymer-containing solution from which the catalyst residues can be readily removed. The present invention is particularly suitable for the removal of hydrogenation catalyst systems which are formed by mixing (a) a compound of the formula Al(R)$_3$, wherein R is hydrogen or an alkyl, cycloalkyl or aryl radical or combinations thereof having 1 to 20 carbon atoms; and (b) a compound of the formula

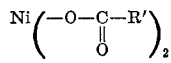

wherein R' is hydrogen or an alkyl, cycloalkyl or aryl radical or combinations thereof having 1 to 20 carbon atoms.

Examples of compounds having the Formula (a) are triisobutylaluminum, triethylaluminum, trieicosylaluminum, dicyclohexyl(phenyl) aluminum, aluminum hydride, trimethylaluminum, dibenzylaluminum hydride, tolylaluminum dihydride, trimethylcyclopentylaluminum, tri(4 - tetradecylcyclohexyl)aluminum, tri(5-cyclopentylpentyl)aluminum, tri(4 - dicyclohexylphenyl)aluminum, tri(3-phenylcyclopentyl)aluminum, and the like.

Examples of compounds having the Formula (b) are nickel stearate, nickel acetate, nickel propionate, nickel formate, nickel octoate, nickel benzoate, nickel naphthenate, nickel eicosoate, the nickel esters of cyclohexane carboxylic acid, o-toluic acid, phenylacetic acid, 4-cyclopentylbutyric acid, 3-methylcyclopentane carboxylic acid, 4-cyclohexylbenzoic acid, 4-(1-naphthyl)cyclohexane carboxylic acid, and the like.

It is desirable to treat the hydrogenated polymer solution, preferably while dissolved in the hydrocarbon solvent, such as paraffins, cycloparaffins or aromatics, or any mixture of these materials. Examples of suitable solvents include n-pentane, n-octane, cyclohexane, benzene, toluene, and the like, or mixtures of these. The polymer concentration in the solvent can vary over the range of 1 to 50 weight percent, although concentrations of about 5 to about 25 weight percent are preferred.

The process of this invention is applicable in the separation of the metals contained in organometal catalyst systems as defined above used in the hydrogenation of any elastomeric or thermoplastic polymer having residual unsaturation, including homopolymers and copolymers of monoolefins having from 2 to 8 carbon atoms; homopolymers and copolymers of conjugated dienes having from 4 to 12 carbon atoms and copolymers of such dienes having from 4 to 12 carbon atoms and monovinylidene-substituted aromatic compounds having from 8 to 18 carbon atoms; and the like. A presently preferred use of the process of this invention is for the treatment of hydrogenated homopolymers and copolymers of conjugated dienes as previously defined and copolymers of such dienes and monovinylidene-substituted aromatic compounds as previously described, having molecular weights in the range of about 25,000 to about 125,000, preferably 30,000 to 75,000. Particularly preferred materials to be treated according to the invention are hydrogenated butadiene/ styrene copolymers, particularly such copolymers containing from about 30 to about 44 parts by weight of butadiene per 100 parts by weight of total monomer charge.

Such presently preferred copolymers can be prepared by any conventional technique known in the art, such as those disclosed in U.S. Pat. 2,975,160. For example, a mixture of butadiene and styrene monomers can be polymerized using butyllithium as the catalyst and tetrahydrofuran as a randomizing agent. Likewise, the hydrogenation can be carried out in any manner know in the art. For example, the copolymer can be hydrogenated over a nickel octoate/triethylaluminum system. Generally, the hydrogenation of the polymeric composition, such as the butadiene/styrene copolymer as above described, is carried out by contacting the polymeric composition in solution with the hydrogenation catalyst under conditions which include temperatures in the range of about 50° to about 500° F., and gauge pressures up to about 1,000 p.s.i. The reaction times can vary from 1 minute to 25 hours, or more, and the reaction can be either a batch or continuous operation.

Preferred conditions include a temperature in the range of about 170° F. to about 400° F.; a pressure in the range of about 10 p.s.i.g. to about 500 p.s.i.g.; and a reaction time in the range of about 3 minutes to about 10 hours. Generally, when hydrogenating the polymer in solution, the pressure will be the lowest practical to maintain the reaction mixture substantially in the liquid phase.

The resulting hydrogenated polymers, as well as the other hydrogenated polymers of the present invention, are preferably polymers which have been sufficiently hydrogenated to remove substantially all of the olefinic unsaturation.

In accordance with the present invention, following the termination of the hydrogenation reaction, the catalyst-containing reaction mixture is contacted with an aqueous phosphate solution in the presence of at least one oxidizing agent. The resulting precipitated catalyst residues can be separated from the hydrogenated polymer solution by any means known in the art, and is conveniently carried out by filtration. The aqueous phosphate solutions which are used in the practice of the present invention comprise any ammonium phosphate, such as meta, monobasic, or dibasic, in aqueous solution, and including partially or completely ammonia-neutralized aqueous solutions of phosphoric acid, optionally in the presence of excess ammonia. The pH of the aqueous phosphate treating solution is greater than 5, preferably greater than 6, and the phosphate ion content is in the range of about 5 to about 50 weight percent. For example, commercial phosphate solutions such as 9:30:0 or 10:34:0 can be used. Such solutions have phosphate ion contents of about 40 and about 46 weight percent, and ammonia contents of about 11 and about 12 weight percent, respectively, and a pH of about 6.2. The amount of aqueous phosphate solution employed preferably is such as to provide a ratio of at least 12, preferably 18, mols of water per mol of nickel.

The oxidizing agents of the present invention are selected from the group consisting of thiuram polysulfides having the formula

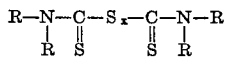

wherein $x$ is 2, 3 or 4; R is selected from the group consisting of alkyl or cycloalkyl radicals containing up to and including 10 carbon atoms, and the R groups attached to a terminal nitrogen atom can be joined to form with said nitrogen atom a heterocyclic structure; elemental halogen; o-quinone; p-quinone; benzoquinone; diphenylquinone; nitroalkyls having the formula $R'CH_2NO_2$, wherein $R'$ is selected from the group consisting of hydrogen and alkyl radicals having from 1 to 7 carbon atoms; nitrobenzene; and m-dinitrobenzene. Examples of thiuram polysulfides which are suitable for use in the practice of the invention are tetramethylthiuram-disulfide, tetraethylthiuram-trisulfide, tetramethylthiuram-tetrasulfide, tetradecylthiuram-disulfide, tetraoctylthiuram-disulfide, tetracyclohexylthiuram - trisulfide, dipentamethylenethiuram-tetrasulfide, and the like. The amount of oxidizing agent which is employed in the practice of the invention should be such as to provide an oxygen-nickel or sulfur-nickel equivalent ratio of at least 1:1, i.e., a molar ratio of oxygen:nickel or sulfur:nickel of 0.5:1. It is presently preferred to employ an oxidizing agent which is soluble in the polymer solution.

In the removal of catalyst residues in accordance with the present invention, the hydrogenation catalyst-containing reaction mixture can be sequentially treated by first adding to the reaction mixture the aqueous phosphate solution followed by the subsequent addition of the oxidizing agent, since it is a particular feature of the present invention that the hydrogenation catalyst must be deactivated prior to the addition of the oxidizing agent. Alternatively, sufficient water can be added to the catalyst-containing reaction mixture to deactivate the hydrogenation catalyst and the phosphate solution and oxidizing agent can then be added in admixture or individually by any sequence. The treating method of the present invention is considered complete when a sample taken of the polymer solution exhibits the color characteristic of nickel salts, e.g., the green cast characteristic of nickel phosphate or nickel hydroxide, or when there is no appreciable color change between consecutively taken samples. Generally, treating times would be on the order of 1 minute to about 48 hours, and more particularly 1 minute to about 1 hour.

The following examples are illustrative of the invention.

A 62 styrene/38 butadiene random copolymer was prepared using the following recipe and conditions:

| | Parts by weight |
|---|---|
| Cyclohexane | 663 |
| Butadiene | 38 |
| Styrene | 62 |
| Tetrahydrofuran | 1.25 |
| n-Butyllithium | 0.12 |

Charge order was: one-half cyclohexane, tetrahydrofuran, butadiene, styrene, remainder of cyclohexane, n-butyllithium. The reaction mixture was heated to 130° F. just before adding the n-butyllithium, and the temperature rose to 218° F. five minutes after adding the n-butyllithium. Total reaction time was 20 minutes. Reaction pressure was 45 p.s.i.g. on initiation of the polymerization reaction, and the pressure rose to 65 p.s.i.g. during the reaction.

The reaction effluent was cooled to 140° F. and concentrated to a solids content of about 15 weight percent.

The cooled, concentrated reaction mixture (cement) was mixed with 0.15 part by weight per 100 parts by weight of polymeric material of a nickel octoate-triethylaluminum mixture having a nickel:aluminum mol ratio of 2:1; preheated to 292° F. and hydrogenated under 300 p.s.i.g. hydrogen pressure at 355° F., with a residence time of 4 minutes. There was substantially no ring hydrogenation and substantially complete hydrogenation of acyclic olefinic bonds.

The hydrogenated polymer cement containing 0.15 part by weight of nickel per 100 parts by weight of polymer was divided into several aliquot portions. The hydrogenated polymer cement is characterized by a blackish cast resulting from the dispersion of black zero-valent nickel throughout the cement.

A first aliquot portion of the polymer cement was heated to 176° F. To this first portion there was added water and filter aid to precipitate the nickel and aluminum catalyst components. The particles formed by this treatment were very small and the filter blinded rapidly with little throughput.

A second aliquot portion of the polymer cement was heated to 176° F. To this second portion there was added an aqueous ammonium phosphate solution having a pH of 6.1 and containing about 20 weight percent phosphate ion. Filtration at high flow rates and throughputs was achieved with this treatment. However, appreciable quantities of colloidal-size black zero-valent nickel passed through the filtering medium, thereby resulting in a hydrogenated polymer having an unacceptably high ash content, and which was not suitable for use as a viscosity index modifier.

A third aliquot portion of the polymer cement was heated to 176° F. To this third portion there was added an aqueous ammonium phosphate solution having a pH of 6.1 and containing about 20 weight percent phosphate ion. This mixture was contacted with air for 2 hours. The amount of air was such as to provide a molecular oxygen:nickel molar ratio of 0.5:1. Conversion of the black zero-valent nickel to green nickel salts began to take place almost instantaneously upon contact of air with the mixture, as evidenced by the formation of a greenish precipitate. After about 41 minutes, substantially no additional greenish precipitate was formed. Filtration at high flow rates and throughputs was achieved with this treatment. The ash content of the filtered polymer cement was substantially reduced. The hydrogenated polymer thus treated was satisfactory for use as a viscosity index modifier.

Other aliquot portions of the polymer cement were heated to 176° F. These portions were individually treated by adding to each an aqueous ammonium phosphate solution having a pH of 6.1 and containing about 20 weight percent phosphate ion. Each of these several portions was then heated to oxidize, if possible, the zero-valent nickel catalyst residue to the divalent state. The results of such oxidant contact are reported in the following table:

| Run | Oxidant | Phr.[a] | Mhr.[b] | Oxidation of nickel to divalent state, minutes |
|---|---|---|---|---|
| 1 | Sulfur | 0.082 | 2.6 | No oxidation. |
| 2 | Sodium phosphate | 0.27 | 1.6 | Do. |
| 3 | Iodine | | 3.0 | 1 minute. |
| 4 | Quinone | | 2.9 | 35 minutes. |
| 5 | Methyl TUADS [c] | | 3.1 | 13 minutes. |
| 6 | Formaldehyde | | 6.4 | No oxidation. |
| 7 | Stearic acid | | 6.3 | Do. |
| 8 | Methanol | | 6.3 | Do. |
| 9 | Nitrobenzene | | 15.2 | 180 minutes. |

[a] Parts by weight of oxidant per 100 parts by weight of hydrogenated polymer.
[b] Millimoles of oxidant per 100 parts by weight of hydrogenated polymer.
[c] Tetramethylthiuram-disulfide.

In the foregoing runs 3, 4, 5 and 9, oxidation of zero-valent nickel to a higher valence state was effected in accordance with the invention as evidenced by the formation of a greenish precipitate. The successful oxidations of runs 3, 4, 5 and 9 demonstrate the effectiveness of treating hydrogenated polymer cements containing nickelous catalyst residues in accordance with this invention, particularly in view of the formation of divalent metal precipitate and the improvement in filtration experienced with the divalent nickel precipitated in the presence of molecular oxygen as an oxidant.

Reasonable variations and modifications are possible within the scope of the disclosure without departing from the spirit and scope thereof.

What is claimed is:

1. A process for separating a hydrogenation catalyst formed by mixing (a) a compound having the formula Al(R)$_3$, wherein R is hydrogen or an alkyl, cycloalkyl or aryl radical or combination thereof having 1 to 20 carbon atoms; and (b) a compound having the formula

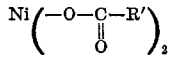

wherein R' is hydrogen or an alkyl, cycloalkyl or aryl radical or combinations thereof having 1 to 20 carbon atoms, from a solution containing such hydrogenation catalyst and from 1 to 50 weight percent of a hydrogenated polymer in a hydrocarbon solvent which comprises contacting said solution with an aqueous solution containing phosphate and ammonium ions, the pH of the solution being greater than 5 and the phosphate ion content in the range of 5 to 50 weight percent and an oxidant selected from the group consisting of thiuram polysulfides having the formula

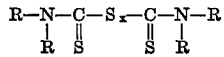

wherein $x$ is 2, 3 or 4 and R is selected from the group consisting of alkyl or cycloalkyl radicals containing up to and including 10 carbon atoms; and wherein the R groups attached to a terminal nitrogen atom can be joined to form with said nitrogen atom a heterocyclic structure;

elemental halogen;
o-quinone;
p-quinone;
benzoquinone;
diphenylquinone;
nitroalkyls having the formula R'CH$_2$NO$_2$, wherein R is selected from the group consisting of hydrogen and alkyl radicals having from 1 to 7 carbon atoms;
nitrobenzene; and
m-dinitrobenzene, the amount of said oxidant shall provide an oxygen-nickel or sulfur-nickel ratio of at least 1:1, said catalyst shall be deactivated prior to the addition of said oxidant; and thereafter separating the thus precipitated nickel phosphate and aluminum phosphate from said solution.

2. A method according to claim 1 wherein said polymer is selected from the group consisting of homopolymers and copolymers of conjugated dienes having from 4 to 12 carbon atoms and copolymers of conjugated dienes having from 4 to 12 carbon atoms and monovinylidene-substituted aromatic compounds having from 8 to 18 carbon atoms.

3. A method according to claim 2 wherein said polymer is a copolymer of butadiene and styrene.

4. A method according to claim 2 wherein said oxidant is elemental iodine.

5. A process according to claim 2 wherein said oxidant is o-quinone.

6. A process according to claim 2 wherein said oxidant is tetramethylthiuram-disulfide.

7. A process according to claim 2 wherein said oxidant is nitrobenzene.

8. A process according to claim 3 wherein said oxidant is elemental iodine.

9. A process according to claim 3 wherein said oxidant is o-quinone.

10. A process according to claim 3 wherein said oxidant is tetramethylthiuram-disulfide.

References Cited
UNITED STATES PATENTS
3,531,448    9/1970    Johnson _____ 260—85.1

JOSEPH L. SCHOFER, Primary Examiner
W. F. HAMROCK, Assistant Examiner

U.S. Cl. X.R.
260—82.1, 88.2 S, 94.7 H, 94.9 F, 96 H